United States Patent [19]

Burckhardt et al.

[11] 4,039,782
[45] Aug. 2, 1977

[54] INSTALLATION FOR CONTROLLING A MEASURING BEAM AND/OR A LIGHT BEAM IN MOTOR VEHICLES

[75] Inventors: Manfred H. Burckhardt, Waiblingen; Jurgen Paul, Stuttgart, both of Germany

[73] Assignee: Daimler-Benz Aktiengesellschaft, Germany

[21] Appl. No.: 623,451

[22] Filed: Oct. 17, 1975

[30] Foreign Application Priority Data

Oct. 25, 1974 Germany ............................ 2450777

[51] Int. Cl.$^2$ .................... G01S 9/04; G06F 15/20
[52] U.S. Cl. .................... 235/150.2; 180/98; 340/53; 343/7 VM
[58] Field of Search .................... 235/150.2, 150.24; 180/98, 105 E; 246/182 R; 240/7.1 A, 8.25; 340/53; 343/7 ED, 7 VM

[56] References Cited

U.S. PATENT DOCUMENTS

| 2,841,782 | 7/1958 | McIlwain | 180/98 |
| 3,415,983 | 12/1968 | McGee | 240/8.25 |
| 3,643,082 | 2/1972 | Fleury | 240/8.25 |
| 3,689,882 | 9/1972 | Dessailly | 180/98 |
| 3,716,822 | 2/1973 | Tsuruta | 340/53 |
| 3,749,197 | 7/1973 | Deutsch | 180/98 |
| 3,778,823 | 12/1973 | Sato et al. | 343/7 VM |
| 3,824,592 | 7/1974 | Mehltretter | 343/7 VM |
| 3,892,483 | 7/1975 | Saufferer | 180/98 |
| 3,921,749 | 11/1975 | Kawada | 180/98 |

Primary Examiner—Charles E. Atkinson
Attorney, Agent, or Firm—Craig & Antonelli

[57] ABSTRACT

An installation for controlling a measuring beam and/or a light beam in motor vehicles, in which at least one measuring and/or light beam transmitted from the vehicle serves for measuring the distance or illuminating objects which are located ahead of the vehicle in its own lane; measuring devices are thereby arranged in the motor vehicle which determine at least the vehicle velocity and the transverse acceleration as well as possibly the longitudinal acceleration or deceleration for correcting the assumed theoretical braking action and, under certain circumstances, still other relevant vehicle magnitudes; the beam transmitter is then controllable as regards the beam range and/or beam opening angle and/or angle deviation of the beam with respect to the vehicle longitudinal axis by a computer as a function of these measured values.

16 Claims, 3 Drawing Figures

INSTALLATION FOR CONTROLLING A MEASURING BEAM AND/OR A LIGHT BEAM IN MOTOR VEHICLES

The present invention relates to an installation for the control of a measuring beam and/or of a light beam in motor vehicles, whereby at least one measuring and/or light beam transmitted from the motor vehicle serves for the purpose of distance measurement and/or illumination of objects which are disposed in front of the motor vehicle in its own lane.

Installations of the aforementioned type are known in the prior art, in which, for example, the headlights of a motor vehicle are pivotally arranged and when driving through a curve, are caused to pivot in the direction into the curve in dependence on the steering wheel deflection. All of these installations whose control is dependent solely on the steering wheel deflection entail in addition to all of the complexities of the control and transmission members the basic disadvantage that they will produce a theoretically correct value only with a driving velocity of zero, that is under static conditions. With a finite vehicle velocity, however, the vehicle travels through a curve in a manner which can differ considerably from the steering wheel deflection. This is due to the characteristics of the axle construction or wheel suspension (for example, under- or over-steering) as well as to the tire dynamics. Thus, for example the defection angle at the wheel on the inside of the curve will be different from that of the wheel on the outside of the curve. Also, the braking operation thereby plays a role.

As a result of this basic control error, far-reaching disadvantages will result in the conventional system. Thus, for example, a headlight pivoted according to this principle would not accurately light-up or illuminate the curve and under certain circumstances would blind the on-coming traffic instead of lighting up its own lane. Analogously, the same would be true for a distance warning installation operating according to this known principle.

The present invention is therefore concerned with the problem of providing such an installation which tabs into account vehicle-dynamic criteria in such a manner that the control is accurately matched to the actually travelled curve radius. This task is solved according to the present invention with the installations of the aforementioned type by providing measuring devices arranged at the motor vehicle which determine at least the vehicle velocity and the transverse acceleration, as well as possibly the longitudinal acceleration (deceleration) to enable correction of the assumed theoretical braking and which under certain circumstances, determine still other relevant vehicle characteristics. On the basis of such measured values the beam transmitter is controlled as regards its beam range and/or beam-opening angle and/or angular deviation with respect to the vehicle longitudinal axis by a computer which generates suitable control signals in dependence on these measured values.

The advantage is achieved with construction according to the present invention that now the beam to be transmitted is controllable according to dynamic considerations, and that it therefore always corresponds to the actually travelled curve radius. A headlight controlled in such a manner, for example, no longer represents a blinding danger for the on coming traffic. The same applies analogously for a distance warning installation which is constructed in this manner.

The measuring devices themselves may thereby be of any suitable type known in the art as long as they supply analog values or very fine stepped digital values, and more particularly in the form of electrical voltages. Thus, for example, the vehicle velocity could be derived from the tachometer. Inertia acceleration measuring devices of conventional type could be used for the measurement of the longitudinal and transverse acceleration. The negative and positive values would thereby have to be taken into consideration with respect to the longitudinal acceleration, i.e., to determine the braking deceleration and the vehicle acceleration. For the transverse acceleration, one apparatus each may be coordinated to each vehicle side which is then effective for one respective curve direction. However, a common apparaus may be provided for each axle direction which, for example, indicates both curve directions---differing by the sign of the generated signal. With the presence of a brake slippage control installation of known type, it would also be feasible to derive from this installation the values for the vehicle velocity and possibly also the values for the longitudinal acceleration.

In detail, it is proposed by the present invention that the range of the measuring and/or light beam is controllable by controlling the beam energy by the use of a computer in such a manner that it increases in proportion to the vehicle velocity and to the transverse acceleration and inversely proportionally to the assumed or measured vehicle longitudinal acceleration. Such a construction is applicable primarily for a distance warning installation.

Another proposal of the present invention is to control the deflection and/or opening angle of the measuring and/or light beam by means of pivoting and/or focusing the transmitter in response to the output of the computer in such a manner that it increases in direct proportion to the transverse acceleration and in inverse proportion to the velocity and to the assumed or measured vehicle longitudinal acceleration. The dependency on the velocity then supplies the normal adjustment for the straight drive which is then adapted to be superimposed on the curve values.

It should also be mentioned in this connection that the beam deflection can take place by pivoting the entire transmitter, the headlights, or a directional antenna under the control of the computer by way of devices actuated by an auxiliary force. The focusing of the beam can be changed analogously, however, with headlights, for example, and also a slight pivoting with respect to one another would be feasible. As to the rest, all measures or some of them can be used together or individually.

It is proposed according to the present invention for a distance-warning system with the aid of a reflected measuring beam that the measuring installation is connected with the computer which forms the control pulses or control values for the transmitter from the measured values and that this computer simultaneously also serves for the evaluation of the received values and for the formation of the signals resulting therefrom. If one starts with the assumption that oppositely travelling vehicles are not present on the lane of the transmitting vehicle itself, then it is further proposed that the computer supresses all received signals which indicate a difference velocity that exceeds the vehicle's own velocity by a predetermined amount. In this manner, all interfering influences can be eliminated which can result from the fact that when driving through a curve, the measuring beam intersects the inside of the curve and as a result thereof, for example, with right side traffic, it also encompasses and detects the on-coming traffic in a left curve. In connection therewith it is additionally proposed according to the present invention that the computer suppresses these received signals only when the pivot and/or opening angle exceeds predetermined fixed, stored boundary values.

Generally, the beam transmitter is pivoted itself in dependence on the control values stemming from the computer or the beam focusing is thus changed. However, it is also possible to connect the pivoting mechanism with the steering system by means of a transmission having a changeable transmission ratio. In that case, the transmission ratio of the transmission is then controlled by the computer, whereby additionally also the steering deflection has to be fed as an input to the computer.

Accordingly, it is an object of the present invention to provide an installation for controlling a measuring or light beam in motor vehicles, which avoids by simple means the aforementioned shortcomings and drawbacks encountered in the prior art.

Another object of the present invention resides in an installation for controlling a measuring or light beam in motor vehicles which is relatively simple in construction and not subject to errors due to different driving velocities and driving conditions.

A further object of the present invention resides in an installation of the aforementioned type which prevents blinding of the oppositely directed traffic, when travelling through a curve.

Still another object of the present invention resides in an installation for controlling a measuring beam and/or light beam in motor vehicles, by means of which the beam to be transmitted is controllable according to dynamic considerations.

Still a further object of the present invention resides in an installation of the aforementioned type in which interfering influences are effectively excluded.

These and other objects, features and advantages of the present invention will become more apparent from the following description when taken in connection with the accompanying drawing which shows, for purposes of illustration only, one embodiment in accordance with the present invention, and wherein.

The principle of the present invention will be explained by reference to a distance warning system, in which a measuring beam is transmitted from a vehicle in order to detect obstacles or other driving vehicles disposed in front of the vehicle and in the same lane as the vehicle and to initiate corresponding signals or brake pulses depending on the distance and difference in velocity therebetween. The range of such a distance warning installation should be so large that with a given velocity the vehicle can still be braked to a safe step after the occurrence of the full warning in front of a stationary obstacle. From this follows a reference distance corresponding to the following equation:

$$A_B = S_R + t_R \cdot v + \frac{v^2}{2a_o g}$$

wherein
$S_R$ — the remaining distance after standstill between the vehicles,
$t_R$ — the general reaction time of a diver,
$v$ — the vehicle velocity,
$a_o$ — the theoretically possible braking under the given road conditions (which maybe set by the driver and fed into the computer as a constant depending on the weather conditions).

The maximum value for such a reference distance is primarily limited by the magnitude of the velocity, at which the warning installation is capable of producing a safe stop based upon the braking available with a standard vehicle braking system.

Figure 1:
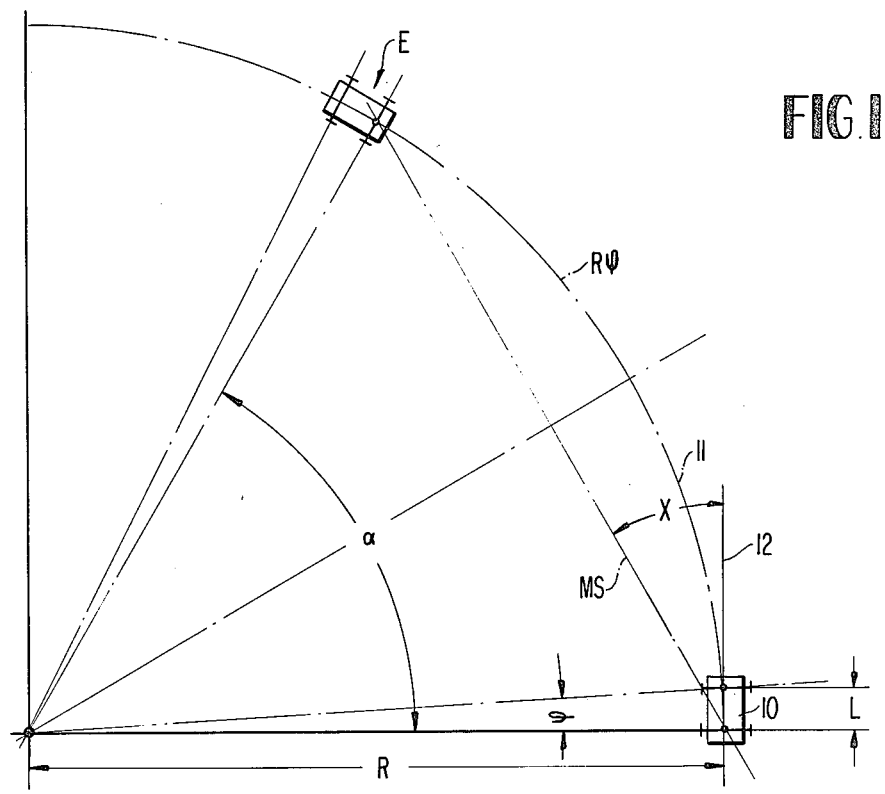
FIGS. 1 and 2 are schematic views explaining the present invention.

When driving through a curve the measuring beam $M_s$ is pivoted with respect to the vehicle longitudinal axis as can be seen from FIG. 1. The vehicle 10 travels along a circular arc 11 and comes to a standstill at the place E after a corresponding braking distance. In order that the measuring beam $M_S$ recognizes in a timely manner an obstacle at the place E, it has to be deflected with respect to the vehicle longitudinal axis 12 by an angle $x$. This angle $x$ has the following relationship to the angle coordinated to the brake path:

$$x = \tfrac{1}{2} \cdot \phi$$

whereas the circular arc which the vehicle has traversed as braking path up to the place E, is given by the formula $$s_B = R \cdot \phi$$

With a curve braking action, it should additionally be considered that the vehicle, when traversing a circular arc with the radius R, is subjected to the transverse acceleration.

$$b_Q = \frac{v^2}{-R}$$

One may now start with the assumption that the Kamm semicircle is valid for the tire behavior, which is a volid assumption for a first approximation. In this case, the following equation is valid for the braking realizable in the curve:

$$a = a_o \cdot \sqrt{1 - \left(\frac{b_Q}{a_o g}\right)^2}$$

One starts thereby with the assumption that the driver maintains constant the braking action which is permissive at the beginning of the curve, up to the standstill. Though an experienced driver is in the position to increase the braking action with a decreasing velocity corresponding to the decreasing transverse acceleration, such a behavior cannot be used as basis for a norm or standard of a safety calculation. The brake path follows from this value for the braking realizable in the curve from the formula mentioned hereinabove.

$$s_B = t_R \cdot v + \frac{v^2}{2 a_o g \cdot \sqrt{1 - \left(\frac{b_Q}{a_o g}\right)^2}}$$

If one combines all of the aforementioned relationships, then one obtains the following equation for the deflection angle $x$ $$x = \frac{1}{2} \cdot t_R \cdot \frac{b_Q}{v} + \frac{b_Q / a_o g}{4 \sqrt{1 - \left(\frac{b_Q}{a_o g}\right)^2}}$$

It can be seen from this equation that the deflection of the measuring beam depends on the instantaneous transverse acceleration, on the vehicle velocity and on the braking. The normal braking $a_o$ determined by the driver corresponding to the road condition is selected manually by the driver, for example, and is fed into the computer.

The foregoing relationship, of course, is not only valid for a measuring beam of a distance warning system but also for the light beam of headlights which are intended to illuminate a curve in an optimum manner.

It can be seen from FIG. 1 that under certain circumstances, the on-coming traffic in the curve is included and detected to an increased extent by this measure. This however, can be avoided with a distance warning installation in which the computer suppresses by conventional means all of those signals which indicate a difference in velocity which exceeds the vehicle velocity of the vehicle itself by a predetermined fixed amount—which amount may be relative or absolute. Such a difference velocity would--as can be readily seen--only be possible if the intercepted object moves opposite the driving direction of the vehicle itself.

Figure 2:
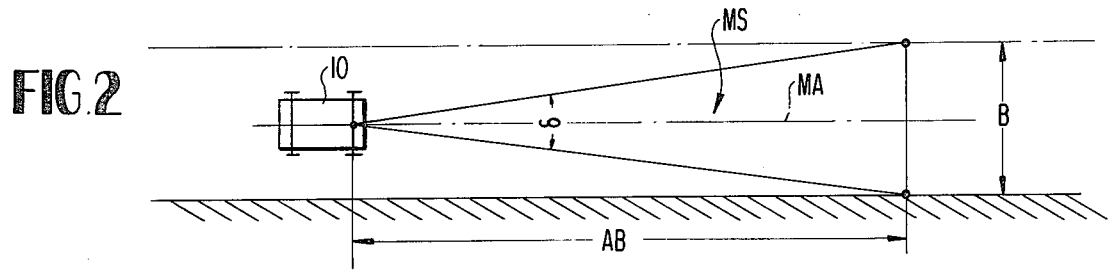

According to FIG. 2, the measuring beam $M_S$ transmitted by the vehicle 10 or the light beam thereof should just detect the road width B at the reference distance AB. The opening angle therefore is obtained from the following equation:

$$\delta = \frac{B}{AB}$$

If one now introduces the aforementioned equation for the reference distance and thereby neglects the residual distance and the reaction time, then one obtains $$\delta = \frac{2 B a_o g}{v^2}$$

The opening angle of the measuring beam is therewith directly proportional to the vehicle deceleration and to the road width as well as inversely proportional to the square of the vehicle velocity. This measuring beam can now be pivoted in the manner described hereinabove, and more particularly in such a manner that the center axis MA of the measuring beam MS is pivoted through the angle $x$ corresponding to the conditions described hereinabove. Another possibility resides in not pivoting the measuring beam so far until its center axis MA has reached the position indicated in FIG. 1, but only until the respective boundary of the measuring beam on the inside of the curve has reached the position indicated by MS in FIG. 1. Finally, it is also feasible not to pivot at all the measuring beam MS, i.e., it axis MA remains in the position of FIG. 2, but solely to change its opening angle, i.e., the angle $\delta$, and more particularly again only so far that the outermost lateral boundary reaches the position according to FIG. 1, i.e., in that case the opening angle would be $\oplus = 2 \cdot x$. However, the principle of the pivoting system is probably preferable since with the change of the opening angle, especially in connection with headlights, intensity losses have to be accepted.

Figure 3:
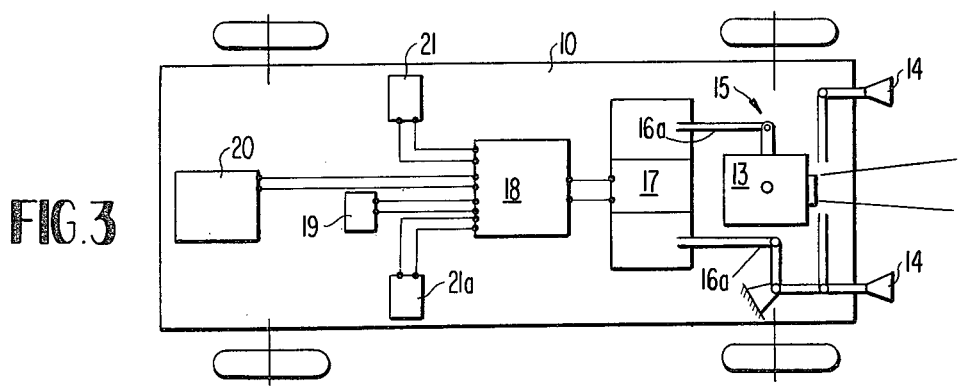
FIG. 3 is a schematic plan view on a motor vehicle equipped with an installation in accordance with the present invention for controlling a measuring and/or light beam in a motor vehicle.

According to FIG. 3, a measuring beam transmitter-receiver 13 is pivotally arranged in the vehicle 10. Also the headlights 14 are pivotally arranged and these two pivotal parts are connected by way of corresponding transmission linkages 16a with the actuating devices 16 which are controlled by auxiliary forces in a conventional manner. The auxiliary force itself is controlled in a conventional manner by a control element 17 which may be formed, for example, by solenoid valves. This control element receives its pulses from a computer 18 of conventional construction, utilizing conventional, commercially available logic elements and therefore not illustrated in detail. As to the rest, the computer 18 also takes over by way of conventional circuits and devices the evaluation of the reflected measuring beam received from the transmitter-receiver 13 and controls the warning signals and/or braking signals. Since the details of the computer 18 form no part of the present invention, and involve conventional circuits known as such in the prior art, a detailed description thereof is disposed with herein for the sake of simplicity.

For determining the input values for the computer 18, at first a measuring apparatus 19 of conventional type for the vehicle velocity is arranged in the vehicle. Furthermore, the vehicle is equipped with two measuring apparatus 20 of conventional construction for the longitudinal acceleration and for the braking deceleration as well as with two conventional measuring apparatus 21 21a, for the transverse acceleration. Of the two latter measuring apparatus, one, for example, the measuring apparatus 21, responds to the centrifugal force in left curves and other, for example, the apparatus 21a, to the centrifugal force in right curves. All measuring apparatus are connected by way of lines with inputs of the computer 18 which then computes from the fed-in measured values by conventional means and in the manner described hereinabove, the output pulses for the control of the pivoting of the transmitter receiver 13 and of the headlights 14. These output pulses are converted in the control element 17 and in the actuating devices 16 into corresponding pivot movements by way of an auxiliary force, for example, by way of a hydraulic or penumatic auxiliary force. In that connection, it should be noted that FIG. 3 does not at all illustrate the actual arrangement of the installation in the vehicle but only indicates the same schenatically. FIG. 3 is intended only to illustrate the construction of such an installation by reference to a schematic showing thereof. The position, size and mutual coordination of the individual parts will depend on existing conditions of the corresponding vehicle.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for controlling a beam in motor vehicles which comprises at least one beam transmitter-receiver means for transmitting a beam from the vehicle which serves for detecting objects located in front of the vehicle in its own lane, wherein the improvement comprises measuring means at the motor vehicle which determine at least the vehicle velocity and the transverse vehicle acceleration, computer means responsive to the measured values from said measuring means for producing control signals for controlling the beam transmitter-receiver means in dependence on the measured values.

2. An installation according to claim 1, characterized in that the control signals produced by said computer means are applied to control said transmitter-receiver means to adjust the range of the beam.

3. An installation according to claim 2, characterized in that the control signals produced by said computer means are applied to control said transmitter-receiver means to adjust the opening angle of the beam.

4. An installation according to claim 3, characterized in that the control signals produced by said computer means are applied to control said transmitter-receiver means to adjust the angular deviation of the beam with respect to the vehicle longitudinal axis.

5. An installation according to claim 1, characterized in that the control signals produced by said computer means are applied to control said transmitter-receiver means to adjust the opening angle of the beam.

6. An installation according to claim 1, characterized in that the control signals produced by said computer means are applied to control the said transmitter-receiver means to adjust angular deviation of the beam with respect to the vehicle longitudinal axis.

7. An installation according to claim 1, characterized in that the beam is a radio-frequency measuring beam.

8. An installation according to claim 1, characterized in that the beam is a light beam.

9. An installation according to claim 1, characterized in that the measuring means includes means to measure the longitudinal acceleration and deceleration of the vehicle for the correction of the assumed theoretical braking action.

10. An installation according to claim 1, characterized in that the range of the beam is controllable by the computer means by means for adjusting the beam energy in such a manner that it increases proportionally to the vehicle velocity and to the transverse acceleration and inversely proportionally to the vehicle longitudinal acceleration.

11. An installation according to claim 10, characterized in that the vehicle longitudinal acceleration is the assumed vehicle longitudinal acceleration.

12. An installation according to claim 10, characterized in that the vehicle longitudinal acceleration is the measured vehicle longitudinal acceleration.

13. An installation according to claim 1, further comprising pivoting means connected to said transmitter-receiver means and responsive to said control signals for controlling the deflection angle of the beam in such a manner that it increases proportionally to the transverse acceleration and inversely proportional to the vehicle velocity and to the vehicle longitudinal acceleration.

14. An installation according to claim 1, further comprising focusing means connected to said transmitter-receiver means and responsive to said control signals for controlling the opening angle of the beam in such a manner that it increases proportionallly to the transverse acceleration and inversely proportionally to the vehicle velocity and to the vehicle longitudinal acceleration.

15. An installation according to claim 1, characterized in that said computer means includes signal control means operable to suppress all received signals which indicate a difference velocity that exceeds the vehicle velocity of the vehicle itself by a predetermined amount.

16. An installation according to claim 15, characterized in that said signal control means in said computer means is operable to suppress the received signals only when one of the two values consisting of the pivot and the opening angle of the beam exceeds a predetermined fixed boundary value.

* * * * *